United States Patent [19]

Seibel

[11] 4,247,945
[45] Jan. 27, 1981

[54] EXTRACTION OF DATA CHARACTERS IMBEDDED IN DATA BYTES

[75] Inventor: Robert R. Seibel, Barnegat, N.J.

[73] Assignee: Bell Telephone Laboratories, Incorporated, Murray Hill, N.J.

[21] Appl. No.: 87,246

[22] Filed: Oct. 22, 1979

[51] Int. Cl.³ .............................................. H04L 7/00
[52] U.S. Cl. .................................. 375/114; 370/100; 371/42; 375/118
[58] Field of Search .............. 340/146.3 WD, 147 SY; 364/121; 370/100, 106; 371/42, 46, 67; 375/111, 114, 116, 118

[56] References Cited

U.S. PATENT DOCUMENTS

| | | | |
|---|---|---|---|
| Re. 29,215 | 5/1977 | Carney et al. | 370/84 |
| 3,603,735 | 9/1971 | Cleobury | 370/106 |
| 3,831,142 | 8/1974 | Fletcher | 371/46 |
| 3,961,311 | 6/1976 | Pavoni et al. | 371/42 |
| 4,161,719 | 7/1979 | Parikh et al. | 375/114 |

Primary Examiner—Benedict V. Safourek

Attorney, Agent, or Firm—Roy C. Lipton

[57] ABSTRACT

Recovery of eight-bit data characters imbedded in the time slots of a train of data bytes individually having six slots available is implemented by a process which locates the bit alignment of a first one of the characters and executes a sequence of assembly procedures to appropriately form this and subsequent characters. The data characters are available as bursts of data characters preceded by synchronizing words having a predetermined bit sequence to create data blocks, the sequential bits of the block being inserted in sequential available slots of the byte train. Recovery is accomplished by comparing the bits of each byte with stored patterns corresponding to overlapping portions of the synchronizing word. A comparison match identifies the bit location of the first character in the burst to thereby define one of a plurality of assembly procedures which process the bits in the identified locations to form the character. The assembly procedure then defines the next subsequent assembly procedure to be executed.

9 Claims, 8 Drawing Figures

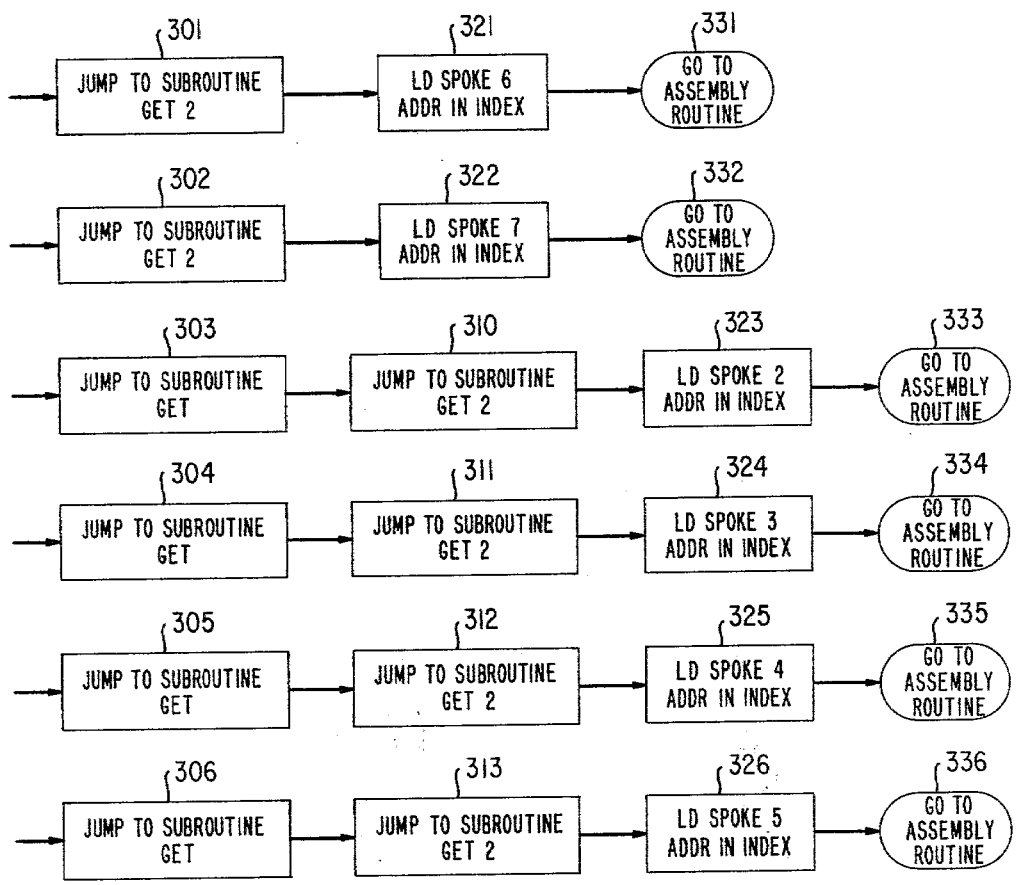

FIG. 6

| EVEN WHEEL | INSTRUCTIONS | CRYPTIC REMARKS |
|---|---|---|

```
EVEN                                      CRYPTIC REMARKS
WHEEL     INSTRUCTIONS              B              C           A

LSP2 (ENTRY POINT)              [X X X X X H G X] [X] [X F E D C B A X]
          1. ROL A                                 X   F E D C B A X X
          2. ROR B               X X X X X X H G  X
          3. ROR B               X X X X X X X H  G
          4. ROR A                                 X   G F E D C B A X
          5. ROR B               X X X X X X X    H
          6. ROR A                                 X   H G F E D C B A
          7. LDX #LSP4           ADDRESS OF NEXT SPOKE, -4
          8. JMP CHKWRD          CHECK ASSEMBLED CHARACTER

LSP4 (ENTRY POINT)              [X X H G F E X]   [X] [X D C B A X X X]
          1. ROL A                                  X   D C B A X X X
          2. ROR B               X X X X H G F E
          3. ROR B               X X X X X H G F
          4. ROR A                                  X   E D C B A X X X
          5. ROR B               X X X X X X H G F
          6. ROR A                                  X   F E D C B A X X
          7. ROR B               X X X X X X H G
          8. ROR A                                  X   G F E D C B A X
          9. ROR B               X X X X X X X H
         10. ROR A                                  X   H G F E D C B A
         11. LDX #LSP6           ADDRESS OF NEXT SPOKE, -6
         12. JMP CHKWRD          CHECK ASSEMBLED CHARACTER

LSP6 (ENTRY POINT)              [X H G F E D C X] [X] [X B A X X X X X]
          1. ROR B               X X A G F E D C   X
          2. ROL A                                  X   B A X X X X X X
          3. ROL A                                  B   A X X X X X X X
          4. ROL B               X H G F E D C B   X
          5. ROL A                                  A   X X X X X X X
          6. ROL B               H G F E D C B A   X
          7. TBA                                    X   H G F E D C B A
          8. LDX #EVEND          ADDRESS OF END OF EVEN WHEEL
         12. JMP CHKWRD          CHECK MSG. CHARACTER IN REG. A

EVEND     1. JSR TIMER           HOUSEKEEPING ROUTINE
          2. LDX #LSP2           ADDRESS OF NEXT SPOKE, -2
          3. JMP NXBYTE          DON'T CHECK REG. A SINCE NO ASSBLY DONE
```

FIG. 7

| ODD WHEEL | INSTRUCTIONS | CRYPTIC REMARKS |
|---|---|---|
| | | B      C      A |
| LSP3 | (ENTRY POINT) | [X X X X H G F X] [X] [X E D C B A X X] |
| | ROL A | |
| | ROR B | |
| | ROR B | |
| | ROR A | |
| | ROR B | |
| | ROR A | |
| | ROR B | |
| | ROR A | |
| | LDX #LSP5 | |
| | JMP CHKWRD | |
| | | |
| LSP5 | (ENTRY POINT) | [X X H G F E D X] [X] [X C B A X X X X] |
| | ROL A | |
| | ROR B | |
| | ROL A | |
| | ROL B | |
| | ROL A | |
| | ROL B | |
| | ROL A | |
| | ROL B | |
| | TBA | |
| | LDX #LSP7 | |
| | JMP CHKWRD | |
| | | |
| LSP7 | (ENTRY POINT) | [X G F E D C B X] [X] [X A X X X X X X] |
| | ROL A | |
| | ROR B | |
| | ROL A | |
| | ROL B | X G F E D C B A |
| | STA B HBYTE | |
| | JSR TIMER | |
| | LDX #ODEND | |
| | JMP NXBYTE | |
| | | |
| ODEND | ROL A | |
| | ROR B | |
| | ROR B | |
| | ROR A | |
| | LDX #LSP3 | |
| | JMP CHKWRD | |

FIG. 8

| | INSTRUCTIONS | | REMARKS |
|---|---|---|---|
| CHKWRD | 1. CMP A | #%10101110 | IS ASSEMBLED CHAR END OF MESSAGE CHARACTER |
| | 2. BEQ | EOM | IF END OF MESSAGE, END ASSY PROCESS, PROCESS MSG-GO TO "START" |
| | 3. CMP A | #%00010110 | IF ASSEMBLED CHAR IS FILL CHARACTER, DON'T STORE |
| | 4. BEQ | NXBYTE | DON'T STORE FILL |
| | 5. DEC | NOCHRS | BEFORE STORING, CHECK MESSAGE BUFFER FOR SPACE |
| | 6. BMI | BUFFUL | IF BUFFER FULL, GO TO ERROR ROUTING "BUFFUL"-GO TO "START" |
| | 7. PSH A | | STORE ASSEMBLED CHAR ONTO STACK (BUFFER) |
| NXBYTE | 1. LDA B | INFLAG | CHECK READY READ FLAG FOR BYTE PRESENT |
| | 2. BPL | *-3 | IF NOT BYTE NOT READY, KEEP LOOPING |
| | 3. LDA B | INDATA | ONCE READY, READ NEW BYTE INTO REG. B |
| | 4. LDA A | HBYTE | LAST DSX-0 BYTE READ HAS FIRST HALF OF NEXT MSG CHAR |
| | 5. STA B | HBYTE | BYTE JUST READ HAS FIRST PART OF NEXT MSG CHAR |
| | 6. JMP X | | AFTER REG A AND B LOADED WITH FIRST AND LAST HALF OF CHAR START ASSEMBLING |

EXTRACTION OF DATA CHARACTERS IMBEDDED IN DATA BYTES

TECHNICAL FIELD

This invention relates to the recovery of data characters and, more particularly, to recovering a block of message data characters whose character bits have been imbedded in a date byte train.

BACKGROUND OF THE INVENTION

Common carriers now provide all-digital central office facilities for data subscribers. In conjunction with one type of digital facility, the date customer provides a synchronous data bit stream at certain ones of different signaling rates and code formats, the digital facility imbeds this data stream into data bytes which are conveyed with the data of other subscribers through the use of, for example, multiplexers to remote carrier offices and the customer data is there reconverted to the original synchronous data bit stream for transmission to a terminating data terminal or base. A common carrier office facility of this type is shown in Reissue U.S. Pat. No. Re 29,215, issued May 10, 1977 to A. C. Carney et al.

The message data information that the subscriber intends to convey to the terminating data terminal (or data base) may take the form of a burst of message data characters. The initial portion of the data burst customarily includes a control or synchronizing code word having a predetermined bit sequence. This code word indicates that a stream of data characters immediately follow, the code word and following characters forming a data block. This date block is transmitted by the subscriber as a sychronous data stream at the appropriate signaling rate to the common carrier facility of the type described above. The common carrier facility imbeds the code word and data character bits of the customer's data into the "character" bit time slots of the byte train (other bits or time slots of each byte being reserved for housekeeping and control purposes). This is advantageously accomplished by reading successive groups having a fixed number of bits (six in the Carney et al reissue patent) from the synchronous data stream and inserting the bits of each group into time slots of each of successive bytes of the byte train. Since the customer code format customarily provides data characters having a different fixed number of bits (in excess of six) and code words that consist of two characters, it is apparent that each of the message characters will be imbedded into two, and sometimes three, successive bytes in the train, each of the code words will be imbedded in three or more successive bytes and corresponding bits of the several characters will be imbedded in different locations in the several bytes.

The bytes with the imbedded bits are multiplexed with bytes containing data from other customers for transmission to a remote carrier office which demultiplexes the multiplexed bytes and recovers the synchronous stream for transmission to the terminating subscriber. This latter subscriber looks for the synchronizing code word and, upon its detection, recognizes that the first data character in the burst is located immediately thereafter, enabling the reassembling of the characters in the original data burst.

It is sometimes necessary for a remote digital facility to reassemble a data burst from an incoming byte train. This may be necessary when the remote facility is the recipient of the message information, requires addressing information in the burst to properly direct the message or for other similar reasons. The remote facility, of course, may recover the original synchronous stream and, thereafter, look for the synchronizing code word whereupon, upon detection of the code word, the facility may initiate the reassembling of the data characters in the burst. This, however, requires two sequential operations before the assembling operation can take place.

It is an object of this invention to determine the location of bits of data characters imbedded in a data byte train. It is a more specific object of this invention to use fewer and simpler operations to determine the locations of the character bits.

SUMMARY OF THE INVENTION

This invention accomplishes the above-stated objects by detecting one of a plurality of bit patterns in the character bits of a byte, the bit patterns comprising different overlapping portions of the synchronizing word and by thereby identifying the bit locations in the byte train of imbedded bits of at least one (and advantageously the first) character in the data burst.

In the illustrative embodiment of this invention, described in detail hereinafter, bit patterns corresponding to the different overlapping synchronizing word portions are stored, noncharacter bits of each byte are masked and the unmasked character bits of each byte are compared with the bits of each stored pattern until a match is detected. The bits of the next byte are then compared with bits of stored patterns corresponding to synchronizing portions that follow the overlapping portion to confirm that a synchronizing word has been detected.

In accordance with a feature of this invention, the imbedded bits in the identified locations are assembled into data characters. More particularly, one of a plurality of assembly procedures is executed, the one procedure being defined in accordance with the bit location alignment that has been defined. In general, execution of the assembly procedure involves the processing of bits of subsequent bytes in the byte train to form the one character in the burst (which is advantageously the first character).

In accordance with a further feature of this invention, the execution of the assembly procedure for each data character includes the defining of the assembly procedure for the next data character.

The foregoing and other objects and features of this invention will be more fully understood from the following description of an illustrative embodiment taken in conjunction with the accompanying drawings.

BRIEF DESCRIPTION OF THE DRAWINGS

In the drawings:

FIGS. 2 and 3, when arranged side-by-side, depict a flow diagram of a process followed by the processor for detecting bit patterns and identifying bit locations in the byte train;

FIGS. 4 and 5 show individual subroutines which are used in the detecting and identifying process; and FIGS. 6, 7 and 8 depict instructions and accompanying remarks for various routines of a process followed by the processor for assembling data characters.

DETAILED DESCRIPTION

Figure 1:
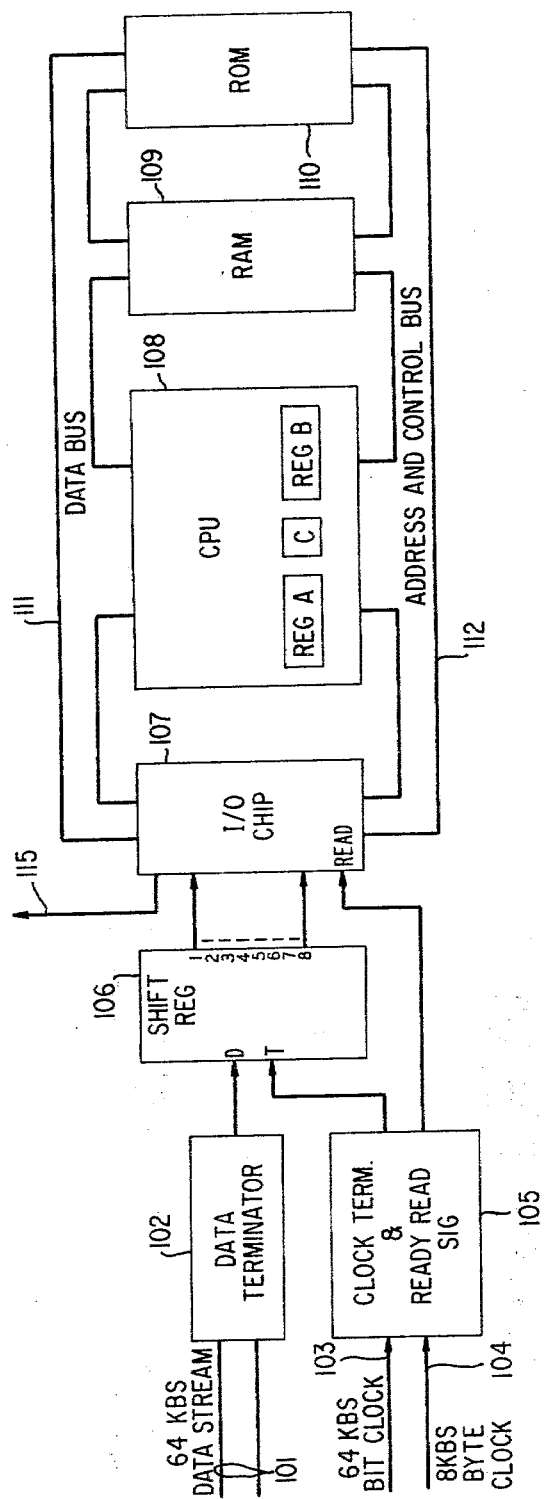
FIG. 1 discloses, in block form, the arrangement of various equipment including a processor which may be used in a central office facility to recover data characters from a byte train in accordance with this invention.
Figure 2:
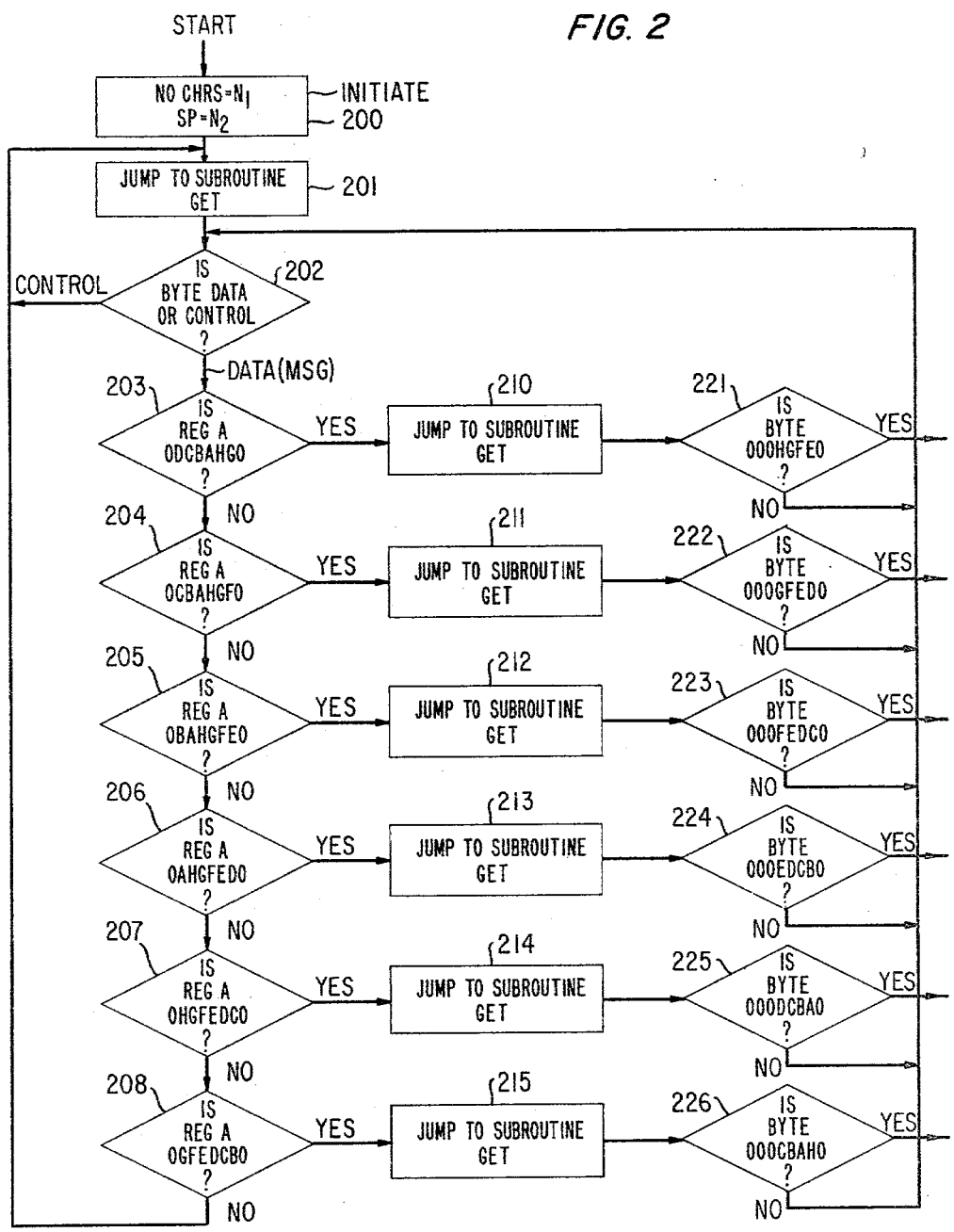

The incoming byte stream to be processed appears on lead pair 101 in FIG. 1 and is applied to data terminator 102. This byte stream is of the type described in Reissue U.S. Pat. No. Re 29,215, as described in the reissue patent, the byte stream constitutes a stream or train of 8-bytes. The particular format of each 8-bit byte involves an initial control bit, a final housekeeping bit and six intermediate bits which contain customer message data. As is further described in the reissue patent, the customer message data may be comprised of an 8-bit synchronous data stream, successive 6-bit portions of the stream being imbedded into successive bytes.

When the customer sends a message, the initial portion constitutes a synchronizing word comprising two 8-bit characters having a predetermined bit pattern followed by a stream of 8-bit message data characters and terminated by an end-of-message (EOM) word. The transmission network inserts the bits of this message data stream, six bits at a time, into each of the above-described bytes. This stream is eventually applied to data terminator 102 and serially applied to the D input of shift register 106.

The transmission network office described in the reissue patent includes therein a 64 kbs clock and an 8 kbs byte clock. The 64 kbs and 8 kbs clock signals are conveyed on leads 103 and 104 and are passed to clock terminator circuit 105. Clock terminator circuit 105 derives a bit clocking pulse from the 64 kbs bit clock signal and this clocking pulse is passed to the "T" input of shift register 106. The bits in the byte stream are thereby passed from data terminator 101 into shift register 106 and shifted through.

The processing of the data stream is provided by a microcomputer which includes in/out chip circuit 107, processor (CPU) 108, random access memory (RAM) 109 and read-only memory (ROM) 110. CPU 108 is a processor which may advantageously comprise the Motorola 6800 microprocessor, which microprocessor communicates data signals by way of a two-way data bus generally indicated by bus 111 and sends address signals over an address and control bus generally indicated by bus 112. Associated with CPU 108 and connected to data and address buses 111 and 112 are the above-described in/out circuit 107 and the RAM 109 and ROM 110.

The ROM 110 is a conventional read-only memory having eight rows of 1024 bits of storage, which storage includes predetermined portions of the known bit pattern of the synchronizing word of the customer message and further includes various instructions for algorithms for processing data received by in/out circuit 107. These algorithms include a first "synchronizing" routine providing instructions for determining the alignment of the bits of the message characters in the customer's message imbedded in the incoming bytes and a second "assembling" routine providing instructions for assembling the bits into message characters and storing the assembled message characters. The RAM 109 is a conventional random access memory capable of storing eight rows of 256 bits. A function of the RAM 109 is to provide temporary storage of message data characters which have been assembled by the CPU 108 in accordance with the instructions stored in ROM 110.

Figure 4:
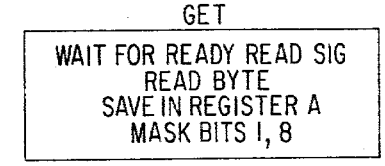

The algorithm which defines the synchronizing process for determining the alignment of the imbedded bits of the message character words can be more readily understood by one having reasonable skill in the art by referring to the flow chart in FIGS. 2-5. This process may be started or initiated after the termination of a previously received message, as described hereinafter. When this situation is ascertained by the CPU 108, it addresses the ROM 110 to obtain a sequence of instructions defining an initial subroutine symbolically shown as block 200. In accordance with these instructions, CPU 108 obtains a first number N1 defining the maximum number of message characters for a message and inserts this number in a register (NOCHRS) and obtains a second number defining an address in RAM 109 for loading assembled characters. After executing subroutine 200, the process advances to the subroutine "GET" which is symbolically shown by block 201 in FIG. 2 and disclosed in detail in FIG. 4. In accordance with these subroutine instructions, as shown in FIG. 4, the microprocessor awaits the reception of an incoming byte and the insertion of the byte into in/out circuit 107, which insertion is defined by the ready read signal applied to the in/out circuit. Upon recognition of the ready read signal, the CPU sequentially addresses the in/out circuit to read the byte stored therein, stores the byte read from in/out circuit 107 into an 8-bit accumulator (designated register "A") in the CPU 108 (see FIG. 1) and masks the first and last bits of the byte whereby the six intermediate bits are stored in CPU register "A".

Upon the completion of subroutine "GET", the microprocessor returns to the synchronization process and, more specifically, to decision 202. The instructions in ROM 110 for decision 202 instructs CPU 108 to examine the final or housekeeping bit of the byte read from in/out circuit 107 to determine if this is a control byte or a data byte. If this byte is a control byte, decision 202 returns the process back to subroutine 201. If this byte is a data byte, the process advances to decision 203.

In accordance with the instruction obtained from the ROM 110 for decision 203, the CPU 108 obtains from the ROM 110 a 6-bit pattern, which 6-bit pattern corresponds to a specific sequential 6-bit portion of the synchronizing character word pair. As seen in decision 203, this sequential bit portion constitutes the final two bits (G and H) of a synchronizing character and the initial four bits (A, B, C and D) of the next subsequent synchronizing character. A match of this bit portion thus obtained from the ROM is made with the six bits in register "A". If there is a mismatch, the process then proceeds to decision 204. Alternatively, if this is a match, the process jumps to subroutine 210 which constitutes subroutine "GET" shown in FIG. 4. This match confirms that the byte contains a portion of the synchronizing word and, more specifically, a specific one of the different bit portions of a synchronizing word. This will lead to the defining of the alignment of the bits of the subsequent message characters and, more specifically, to the determination of the locations of the various message character bits in the following incoming bytes to enable the subseqent assembling of the characters.

Assume now that there is a match and the process has jumped to subroutine 210. Subroutine 210 constitutes the series of instructions which constitute subroutine "GET". Accordingly, CPU 108 proceeds to execute the instructions, described above, to wait for the ready read signal and, upon the signal being obtained from clock terminator 105, to read out the new incoming byte in in/out circuit 107, storing this byte in register "A" and masking out the initial and final bits (bits 1 and 8) of the byte. This completes the subroutine "GET" and the CPU 108 returns to the synchronizing process, advancing to decision 221.

For decision 221 the CPU 108 is instructed to obtain from ROM 110 a 4-bit pattern which corresponds to the final four bits (E, F, G, H) of a synchronizing character. A match of this bit portion obtained from the ROM is made with the bits in the first four unmasked stages of register "A", which bits constitute the last four bits of the byte obtained, in time, from the customer data. If there is a mismatch, the process then proceeds back to decision 202. Alternatively, if there is a match, the presence of the synchronizing word leading to the defined alignment is confirmed and the process advances to subroutine 301 (FIG. 3).

Subroutine 301 comprises the instructions of subroutine "GET 2" which is disclosed in detail in FIG. 5. In accordance with the instructions in subroutine "GET 2", as shown in FIG. 5, CPU 108 awaits the reception of the next incoming byte and its insertion into in/out circuit 107, as indicated by the application of the ready read signal to the in/out circuit by clock terminator 105. Upon recognition of this ready read signal, the CPU 108 sequentially addresses the in/out circuit 107 to read the byte stored therein and to store the byte in a CPU 108 register hereinafter designated as register "B" as shown in FIG. 1. The byte is also stored in register "HBYTE", for reasons discussed hereinafter. This completes subroutine "GET 2" and the process returns to the "synchronizing" routine and advances to "load index" routine 321. More specifically, CPU 108 loads the address of "SPOKE 6" of the assembly routine into its index register and the process advances to exit point 331 which jumps to entry points of the assembly routine, described hereinafter.

Assume now that the CPU 108 finds a mismatch in decision 203 and proceeds to decision 204 as described above. In this event the CPU obtains from the ROM 110 a 6-bit pattern which corresponds to a different sequential 6-bit portion of the synchronizing character word pair. Specifically, as seen in decision 204, this sequential bit portion constitutes the final three bits (F, G, H) of a synchronizing character and the initial three bits (A, B, C) of the next subsequent synchronizing character. A comparison of this bit portion is now made with the six bits in register "A". If there is a mismatch, the process proceeds to decision 205. Alternatively, if there is a match, the process jumps to subroutine 211.

Assume now that the decision 204 finds a bit portion match and the process advances to subroutine 211. Subroutine 211 contains the instructions of subroutine GET. Accordingly, CPU 108 now proceeds to wait for the ready read signal from clock terminator 105 and thereupon reads the next incoming byte out of in/out circuit 107, storing the byte in register "A" and masking the initial and final bits of the byte. The process then returns to the "synchronizing" routine, advancing to decision 222. The CPU 108 for this decision is instructed by ROM 110 to obtain a 4-bit pattern in the ROM which constitutes the fourth through seventh bits (D, E, F, G) of a synchronizing character. This 4-bit pattern is then compared with the bits in the first four unmasked stages of register "A". If there is a mismatch, the process returned to decision 202. Alternatively, if there is a match, the process jumps to subroutine 302.

The instructions for subroutine 303 constitute the instructions for subroutine "GET 2". Accordingly, the next incoming byte is read out of in/out circuit 107 and inserted into register "B" and register "HBYTE". The process then goes to routine 322 wherein CPU 108 loads the address of "SPOKE 7" of the assembly routine into the index register. The process thereafter advances to exit point 332 wherein the process jumps to an appropriate entry point of the assembly routine.

In the event that when the process is in decision 204 CPU 108 finds a mismatch, the process proceeds to decision 205 as described above. In this event, CPU 108 obtains from ROM 110 a 6-bit pattern constituting a final four bits (E, F, G, H) of the synchronizing character followed by the initial two bits (A, B) of the (next subsequent) synchronizing character. A match of this bit portion pattern is made with the the six bits in register "A". If there is a mismatch, the process proceeds to decision 206. Alternatively, if there is a match, the process jumps to subroutine 212.

Assume now that there is a match and the process has jumped to subroutine 212. The instructions for subroutine 212 constitutes the instructions of subroutine "GET". Accordingly, CPU 108 executes the subroutine instructions described above, waiting for the ready read signal and, upon the signal being obtained from the clock terminator 105, reading out the new incoming byte from in/out circuit 107, storing this byte in register "A" and masking out the initial and final bits of the byte. Upon the completion of this subroutine 212, CPU 108 returns to the synchronizing routine whereby the process advances to decision 223. In decision 223 CPU 108 is instructed to obtain from ROM 110 a 4-bit pattern which corresponds to the third through sixth bits (C, D, E, F) of the synchronizing character. This 4-bit sequence is then compared with the bits in the first four unmasked stages of register "A". If there is a mismatch, the process returns to decision 202. Alternatively, if there is a match, the process jumps to subroutine 303.

The instructions for subroutine 303 constitutes the instructions of the subroutine "GET". CPU 108 thereupon proceeds to wait for the ready read signal and, upon detecting the signal, reads the next subsequent incoming byte now stored in in/out circuit 107 and stores the byte in register "A", masking the initial and final bits of the byte. The process then returns to the synchronizing routine advancing to subroutine 310. Subroutine 310 comprises the instructions of subroutine "GET 2". With the process in subroutine "GET 2", CPU 108, as described above, awaits the next ready read signal and thereupon addresses the in/out circuit to read out the next subsequent incoming byte stored in in/out circuit 107, loading the byte into register "B" and register "HBYTE". This completes subroutine "GET 2", whereupon the process returns to the synchronizing routine and, more specifically, to subroutine 310 wherein CPU 108 loads the "SPOKE 2" address into the index register. The process then advances to the exit point 333 which jumps to an appropriate entry point of the assembly routine and, more specifically, to "SPOKE 2" of the assembly routine.

In the event that when the process is in decision 205 CPU 108 finds a mismatch, the process advances to decision 206. CPU 108 obtains from ROM 110 the sequential 6-bit portion of the synchronizing character word pair constituting the final five bits (D, E, F, G, H) of the synchronizing character followed by the initial bit (A) of the (next subsequent) synchronizing character. If there is a mismatch with the six bits in register "A", the process proceeds to decision 207. Alternatively, if there is a match, the process jumps to subroutine 213.

Subroutine 213 constitutes the instructions for subroutine "GET" and CPU 108 thereupon obtains the next incoming byte for insertion into register "A", masking the initial and final bits of the byte. The process returns to the synchronizing routine advancing to decision 224. CPU 108 obtains a 4-bit pattern which constitutes the second through fifth bits (B, C, D, E) of the synchronizing character. If this 4-bit sequence does not match with the first four unmasked stages of register "A", the process returns to decision 202. Alternatively, if there is a match, the process jumps to subroutine 304.

Subroutine 304 constitutes the instructions of subroutine "GET" and CPU 108 thereupon obtains the next incoming byte for storage in register "A", masking out the initial and final bits of the byte. The process then proceeds to subroutine 311 which constitutes the instructions for subroutine "GET 2". CPU 108 then proceeds to obtain the next subsequent incoming byte from in/out circuit 107 storing this byte in register "B" and register "HBYTE". The process then returns to the synchronizing routine, and, more specifically, to subroutine 324, storing the address of "SPOKE 3" in the index register and then advancing to exit point 334 which leads to an appropriate entry point of the assembly routine and, more specifically, to "SPOKE 3" of the assembly routine.

If the result of decision 206 is a mismatch, the process advances to decision 207, CPU 108 obtains from ROM 111 a 6-bit portion pattern of the synchronizing character word pair constituting the final six bits (C, D, E, F, G, H) of a synchronizing character. A comparision of this bit portion is made with the six bits in register "A". If there is a mismatch, the process proceeds to decision 208. If there is a match, the process jumps to subroutine 214.

Subroutine 214 provides the instructions of subroutine "GET" and CPU 108 thereupon obtains the next incoming byte from in/out circuit 107 and stores this byte into register "A", masking the initial and final bits of the byte. The process then returns to the synchronizing routine advancing to decision 225. CPU 108 obtains a 4-bit pattern which constitutes the first through fourth bits (A, B, C, D) of a synchronizing character. This 4-bit sequence is compared with the first four unmasked stages of register "A". If there is a mismatch, the process returns to decision 202. If there is a match, the process jumps to subroutine 305.

Subroutine 305 constitutes the instructions of subroutine "GET" whereupon CPU 108 obtains the next incoming byte and inserts this byte into register "A", masking the initial and final bits of the byte. The process then returns to the synchronizing routine advancing to subroutine 312. Subroutine 312 constitutes the instructions of subroutine "GET 2". CPU 108 therefore obtains the next subsequent incoming byte, inserting the byte into register "B" and register "HBYTE". The process now returns to subroutine 325 of the synchronizing routine, loading the address of "SPOKE 4" into the index register and advancing to exit point 335 which leads to the assembly routine and, more specifically, to "SPOKE 4" of the assembly routine.

Assume now that decision 207 results in a mismatch and the process advances to decision 208, as previously described. CPU 108 obtains from the ROM 110 a 6-bit pattern which corresponds to the second through seventh bits (B, C, D, E, F, G) of a synchronizing character and matches this bit portion with the six bits in register "A". If there is a mismatch, the process proceeds back to subroutine 201. Alternatively, if there is a match, the process jumps to subroutine 215.

In subroutine 215, CPU 108 obtains the next subsequent incoming byte and inserts into register "A" masking the initial and final bits of the byte. The process then returns to the synchronizing routine advancing to decision 226. CPU 108 obtains a 4-bit pattern which constitutes the final bit (H) of a synchronizing character followed by the initial three bits (A, B, C) of a next synchronizing character. This 4-bit sequence is compared with the bits in the first four unmasked stages of register "A". If there is a mismatch, the process returns to decision 202. Alternatively, if there is a match, the process jumps to subroutine 306 which constitutes the instructions for subroutine "GET". CPU 108 thereupon obtains the next subsequent byte from in/out circuit 107 and then inserts the byte into register "A" masking the initial and final bits of the byte. The process then returns to the synchronizing routine advancing to subroutine "GET 2". CPU 108 obtains the next subsequent incoming byte and inserts this byte into register "B" and register "HBYTE". The process then returns to subroutine 326 of the synchronizing routine, loading the address of "SPOKE 5" into the index register and advancing to exit point 336 which leads to the assembly routine and, more specifically, to "SPOKE 5" of the assembly routine.

The instructions and remarks of the various portions of the assembly routine are shown in FIGS. 6–8. The instructions and remarks for the even numbered "SPOKES" of the assembly routine are shown in FIG. 6 while the instructions and remarks for the odd numbered "SPOKES" are shown in FIG. 7. With these instructions and remarks, there is also shown the various storage conditions of register "A" and register "B" and the conditions of a 1-bit carry register.

Assume now that CPU 108, when performing decisions 205 in the synchronizing routine, found a match and subsequently, when performing decisions 223, also found a match with the bits in register "A". The next incoming byte is then placed in register "A" and the following byte is placed in register "HBYTE" and in register "B" by subroutines 303 and 310, as previously described and the address of "SPOKE 2" is loaded into the index register. Under this condition the first six bits of the first data character in the message following the synchronizing character pair word are stored in register "A" and the last two bits are stored in register "B". This storage condition is depicted for the several registers in FIG. 6 remarks for the instructions associated with the "SPOKE 2" entry point.

In accordance with the first set of instructions (1. ROL A) for the "SPOKE 2" subroutine of the assembly routine, the bits in register "A" are rotated to the left. As indicated in the corresponding remarks, this shifts the first six bits of the data character into the leftmost stages of register "A". For the next two sets of instructions (2. ROR B and 3. ROR B) of the "SPOKE 2" subroutine, the bits in register "B" are twice rotated to the right and this results in first shifting the last two bits of the character into the two rightmost stages of register "B" and then shifting the next to last (G) bit into the carry register and shifting the last (H) bit into the rightmost stage of register "B".

The next instruction (4. ROR A) rotates register "A" to the right, thereby shifting all of the bits in register "A" one stage and, in addition, shifting the G bit from the carry register into the leftmost stage of register "A". The following two sets of instructions (5. ROR B and 6. ROR A) rotate the bits in register "B" to the right to shift the final bit (H) into the carry register and rotate the bits in register "A" to the right to shift the final bit (H) into the leftmost stage of register "A", shift the first bit (A) into the rightmost stage of register "A" and shift the remaining bits into the corresponding intermediate stages. It is apparent at this time that the first data character is now fully assembled in register "A". The next set of instructions (7. LDX#LSP4) in the process then loads the address of the next "SPOKE" into the index register, which next address defines "SPOKE 4". The next instruction (8. JMP CHKWRD) then advances the process to the check word (CHKWRD) subroutine which will check the assembled character in register "A" and store the character, if appropriate, or provide any other appropriate action.

The instructions and remarks for the "CHKWRD" subroutine are shown in FIG. 8. In accordance with the first set of instructions (1. CMP A) of the subroutine, a comparison is made between the data character now assembled in register "A" and an end-of-message (EOM) character stored in a predetermined location in ROM 110. If there is a mismatch, the process advances to the set of instructions (3. CMP A). In the event, however, that there is a match, the process terminates the assembling of the message characters and proceeds to process the message previously stored in a character stack or queue in RAM 109. This message processing may comprise any conventional routine for delivering the message. For example, ROM 110 might contain a routine instructing CPU 108 to remove the data characters of the message stored in the queue or stack, one at a time and sequentially pass the characters to in/out circuit 107 which then transmits the message onto output lead 115.

At the termination of the delivery routine, the process goes to "START" in the synchronizing routine where, as previously described, the process is initialized by placing the appropriate number (N1) corresponding to the maximum number of data characters of a message into a first predetermined temporary store (NOCHRS) in RAM 109 and by placing a second number (N2) defining the address pointer to the input stage of the message stack in a second predetermined temporary store (SP) in RAM 109. The synchronizing routine then re-resumes as previously described.

Assume now that CPU 108 has determined that the first check instruction (1. CMP A) of the character in register "A" for an end-of-message character does not find a match and that the character is not EOM. The "CHKWRD" subroutine then proceeds to the second check or comparison instruction set (3. CMP A) to determine if the character is a "FILL" character. If CPU 108 finds a match, the routine proceeds directly to subroutine "NXBYTE", described hereinafter. This has the effect of not storing the "FILL" character in the RAM buffer stack.

In the event that the (3. CMP A) instructions that check for a "FILL " character do not find a match, the "CHKWRD" subroutine proceeds to set of instructions (5. DEC). In accordance with these instructions, the number loaded into the "NOCHRS" store by the initializing subroutine of the synchronizing routine is decremented and CPU 108 checks the new number to be sure that it is not a negative number indicating that the buffer stack is full. In the event that the number is negative, the routine goes to instructions (6. BMI) which provides a conventional error routine wherein CPU 108 advantageously obtains an error message from ROM 110, passing the error message to I/O circuit 107 to thereby send the message over line 115. After the error routine is completed, the process returns to "START" in the synchronizing routine to re-initiate the process and re-resume the routine as previously described.

If the "NOCHRS " number is not negative indicating available storage in the buffer stack, the routine goes to instructions (7. PSH A). These constitute conventional instructions for obtaining the data bits in register "A" and loading them into the input or initial stage of the RAM buffer stack, which stage is defined by the address (N2) previously placed in register SP as part of the initializing subroutine 200 of the synchronizing routine. At the conclusion of this storing of the assembled data character into the stack, the process proceeds to subroutine "NXBYTE".

The initial instructions of subroutine "NXBYTE" constitute instructions (1. LDA B and 2. BPL) which form a loop that checks for the ready read signal applied by terminator 105 to I/O circuit 107. The exit from this loop occurs when the ready read signal is detected, whereupon the process exits at instruction (3. LDA B). Instruction (3. LDA B) now obtains the new incoming byte from I/O circuit 107, inserting this byte into register "B". The next instruction (4. LDA A) loads into register "A" the byte presently stored in register "HBYTE", which byte as previously described was stored therein by the "GET 2" subroutine 210 and constitutes the byte stored in register "B" during the "SPOKE 2" subroutine. Accordingly, the byte now in register "A" contains the first part of the next subsequent message character and the byte stored in register "B" contains the second or final part of the next message character. The next instruction (5. STA B) obtains the byte now stored in register "B" and stores this byte into the "HBYTE" register of RAM 109. The subroutine now terminates with instruction (6. JMP X), the appropriate "SPOKE" subroutine, which subroutine is defined by the address stored in the index register. This address, as previously described, presently being the address for "SPOKE 4".

The "SPOKE 4" subroutine of the assembly routine may be entered from the (6. JMP X) instruction in the "NXBYTE" subroutine, as described above, or from exit point 335 in the synchronizing routine, as previously described. In either event, the first four bits of the next subsequent data character in the message are stored in register "A" and the last four bits are stored in register "B", the bits of the byte stored in register "B" being also stored in register "HBYTE". The storage condition for registers "A" and "B" is depicted in FIG. 6 under the remarks for the instructions associated with the "SPOKE 4" entry point.

In accordance with the initial ten instructions for the "SPOKE 4" subroutine of the assembly routine, the bits in registers "A" and "B" are rotated until all of the bits of the data character are appropriately aligned in register "A". The next set of instructions (11. LDX#LSP6) in the subroutine then loads the address of the next "SPOKE" into the index register, which next address defines "SPOKE 6". The next instruction (12. JMP CHKWRD) then advances the process to the check word (CHKWRD) subroutine which will check the assembled character in register "A" and store the character, if appropriate, or provide any other appropriate action as described above.

The instructions and remarks for the "CHKWRD" routine are shown in FIG. 8 and, as previously described, checks to see whether the data character is an EOM character, in which event, the message in the buffer stack is delivered to lead 115 and the process goes to "START" in the synchronizing routine, checks to see if the character is a "FILL" character whereupon the process goes directly to subroutine "NXBYTE" without storing the character in the buffer queue and checks to see if the buffer is full, in which event, an error message is sent to lead 115 and the process returns to "START". Assuming none of the above conditions exists, the character in register "A" is loaded into the buffer stack and the process proceeds to subroutine "NXBYTE". In this subroutine, the next incoming byte is loaded into register "B", the byte in register "HBYTE" is loaded into register "A" and the byte in register "B" is loaded into register "HBYTE". The first two bits of the next character is therefore now in register "A" and the last six bits are in register "B". At this point the process jumps to the next "SPOKE" subroutine which comprises "SPOKE 6".

The "SPOKE 6" subroutine can be entered from the "NXBYTE" subroutine, as described above, or from exit point 331 in the synchronizing routine, as previously described. The first six instructions of the "SPOKE 6" subroutine rotates the bits in registers "A" and "B" until all of the bits of the data character are in register "B". The next instruction set (7. TBA) transfers the bits in register "B" to register "A" whereby the latter register contains all of the bits of the data character. At this point, the address of the "EVEN SPOKE" is entered into the index register by instruction 8. LDX#EVEND and instruction 9. JMP CHKWRD jumps the process to subroutine "CHKWRD". As previously described, with the process in subroutine "CHKWRD", the data character is checked as to whether or not it is an EOM character or a "FILL" character and the "NOCHR" number is decremented and checked to indicate if the buffer is full. If none of these conditions exist, the character is loaded into the buffer stack and the process advances to subroutine "NXBYTE". In this subroutine, the next incoming byte is loaded into register "B" and the byte in register "HBYTE" is loaded into register "A" while the byte now in register "B" is transferred to register "HBYTE", as previously described. The process then jumps back to the appropriate "SPOKE", which in this case is the "EVEND" spoke.

It is to be noted at this time that the final six bits of the last data character in the message are in register "A" while the first six bits of the next character are in register "B". Accordingly, at this time, the process can pause until the next byte is received by in/out circuit 107. The first instruction for the "EVEND" spoke is thus the first instruction (1. JSR TIMER) to time a delay interval, which interval may be fruitfully employed to provide any housekeeping chores. After this timed interval, the process advances to instruction (2. LDX#LSP2) which advises CPU 108 to load the address of "SPOKE 2" into the index register. The process then advances to instruction (3. JMP NXBYTE) to jump the process to subroutine "NXBYTE". As previously described, the subroutine "NXBYTE" obtains the next incoming byte from I/O circuit 107 for insertion into register "B", loads the byte presently in register "HBYTE" into register "A" and stores the byte now in register "B" into register "HBYTE". Under this condition, the first six bits of the next message character are now in register "A" and the final two bits of this next character are in register "B". These storage conditions of registers "A" and "B" are the initial conditions appropriate for the "SPOKE 2" subroutine. The last instruction (6. JMP X) of subroutine "NXBYTE" now jumps the process back to the "SPOKE" process and, more specifically, to the "SPOKE 2" process, since this address is presently stored in the index register. Subsequent assembling is therefore identical to the priorly described processing of the data characters.

The instructions for the subroutines of the odd spokes together with the remarks thereof are shown in FIG. 7, Assume, for example, that the synchronizing routine exits at exit point 334. In this event the process, as described above, advances to the entry point of "SPOKE 3". At the same time, the first five bits of the data character are in register "A" and the last three bits are in register "B". The instructions for "SPOKE 3" are similar to the instructions for previously described even "SPOKES". With respect to "SPOKE 3", the bits in registers "A" and "B" are rotated through carry register "C" until all of the data characters are in register "A". The address of the next successive "SPOKE", namely, "SPOKE 5", is entered into the index register and the process jumps to the "CHKWRD" subroutine described above. The data character is thus checked for an EOM or "FILL" character and the buffer is checked to see if it is full. If none of these conditions exist, the character assembled in register "A" is pushed into the stack and the process advances to the "NXBYTE" subroutine wherein the new incoming byte is inserted into register "B", the byte in register "HBYTE" is transferred to register "A" and the byte newly stored in register "B" is stored in register "HBYTE". At this point, the first three bits of the new data character are in register "A" and the next five bits are in register "B". The "NXBYTE" subroutine is then terminated by the process jumping to the "SPOKE 5" subroutine.

The "SPOKE 5" subroutine may be entered from the "NXBYTE" subroutine, as described above, or from exit point 336 of the synchronizing routine. The instructions of the "SPOKE 5" subroutine enables CPU 108 to rotate the bits in registers "A" and "B" and through register "C" until all of the bits of the characters are in register "B". The bits in register "B" are then transferred to register "A" by the (7. TBA) instruction and the address of the "SPOKE 7" routine is inserted into the index register whereupon the process jumps to the "CHKWRD" subroutine. The assembled character is thereupon then checked and the message buffer is examined and, if appropriate, the assembled character is then inserted into the buffer stack. The process proceeds to subroutine "NXBYTE" where the next incoming byte is inserted into register "B", the last incoming byte in register "HBYTE" is passed to register "A" and the new byte in register "B" is stored in register "HBYTE". At this time, the first bit of the new message data character is in register "A" and the second through seventh bits are in register "B". It is to be noted that the final bit has not been received as this bit is in the byte which will be received next.

At this point, the process jumps to the "SPOKE 7" entry point which also can be entered from exit point 332 of the synchronizing routine. CPU 108 now proceeds to rotate the bits in registers "A" and "B" through carry register "C" until the first seven bits priorly stored are all in register "B". In accordance with the first instructions for "SPOKE 7", the bits in register "B" are then stored in register "HBYTE" and after an appropriate timing delay the address of the "end-of-odd" wheel spoke is inserted into the index register and the process jumps to the "NXBYTE" subroutine. In accordane with this subroutine, the new incoming byte is inserted into register "B" and the seven assembled bits of the data character in register "HBYTE" are stored in register "A". The new incoming byte in register "B" is now inserted into register "HBYTE" and, in accordance with instruction 6. JMP X of the "NXBYTE" subroutine, the process jumps to the "ODEND" subroutine which is the end-of-odd wheel spoke subroutine. In this subroutine, the seven character bits in register "A" and the one final character bit in register "B" are rotated until all of the character bits are in register "A". The address of the "SPOKE 3" subroutine is then inserted into the index register and the process jumps to the "CHKWRD" subroutine to assemble the character now fully stored in register "A", storing this character if appropriate in the buffer stack. Thereafter, the process goes to subroutine "NXBYTE" to obtain the new incoming byte, transferring the byte in register "HBYTE" into register "A" and storing the new incoming byte in register "B" into register "HBYTE". At this time, the first five bits of the new message character are in register "A" and the last three bits are in register "B", which condition is appropriate for "SPOKE 3". The last instruction of subroutine "ODEND" then jumps the process to the "SPOKE 3" entry point and the above-described assembly process for the various odd "SPOKES" is then repeated.

Although a specific embodiment of this invention has been shown and described, it will be understood that various modifications may be made without departing from the spirit of this invention.

I claim:

1. A method of recovering m-bit, data characters imbedded in character bits of a data byte train, each byte having n character bits, where m and n are different integers, groups of the data characters being preceded by synchronizing words having a predetermined sequence of at least 2n−1 characters bits, comprising the steps of:
    detecting in a byte one of a plurality of bit patterns, the bit patterns comprising different overlapping portions of the predetermined bit sequence of the synchronizing word, and
    identifying bit locations in the byte train of imbedded bits of at least one of the data characters in the group of data characters that is preceded by the synchronzing word having the detected pattern.

2. A method of recovering m-bit, data characters, in accordance with claim 1, and further including the step of assembling imbedded bits into data characters in accordance with the identified bit locations.

3. A method of recovering m-bit, data characters, in accordance with claims 1 or 2, wherein the step of detecting includes the steps of storing n-bit patterns corresponding to the different synchronizing word portions, masking noncharacter bits of each byte in the train and comparing unmasked character bits of each byte with each of the stored n-bit patterns until a match is detected.

4. A method of recovering m-bit, data characters, in accordance with claim 3, wherein the step of detecting further includes the steps of storing bit patterns corresponding to portions of the synchronizing word that follow the different overlapping portions and comparing character bits of a byte subsequent in the train to the byte having a bit portion match with the stored bit pattern that corresponds to the following bit portion.

5. A method of recovering m-bit, data characters, in accordance with claim 2, wherein the step of assembling includes the step of executing a defined one of a plurality of assembly procedures, each procedure individual to a different bit location alignment for a data character.

6. A method of recovering m-bit, data characters, in accordance with claim 5, wherein the step of identifying includes the steps of storing bytes subsequent, in the train, to the byte having the detected pattern and defining the assembly procedure individual to the bit location alignment of the one data character in the data character group.

7. A method of recovering m-bit, data characters, in accordance with claim 6, wherein the step of executing the defined assembly procedure includes the step of processing the bits of the stored subsequent bytes.

8. A method of recovering m-bit, data characters, in accordance with claim 7, wherein the step of executing further includes the steps of defining a next one of the plurality of assembly procedures individual to a next one of the data characters in the data character group and processing bits of stored subsequent bytes in accordance with the defined next assembly procedure.

9. A method of recovering m-bit, data characters, in accordance with claim 8, wherein the step of executing additionally includes the step of storing additional ones of the subsequent bytes.

* * * * *